UNITED STATES PATENT OFFICE.

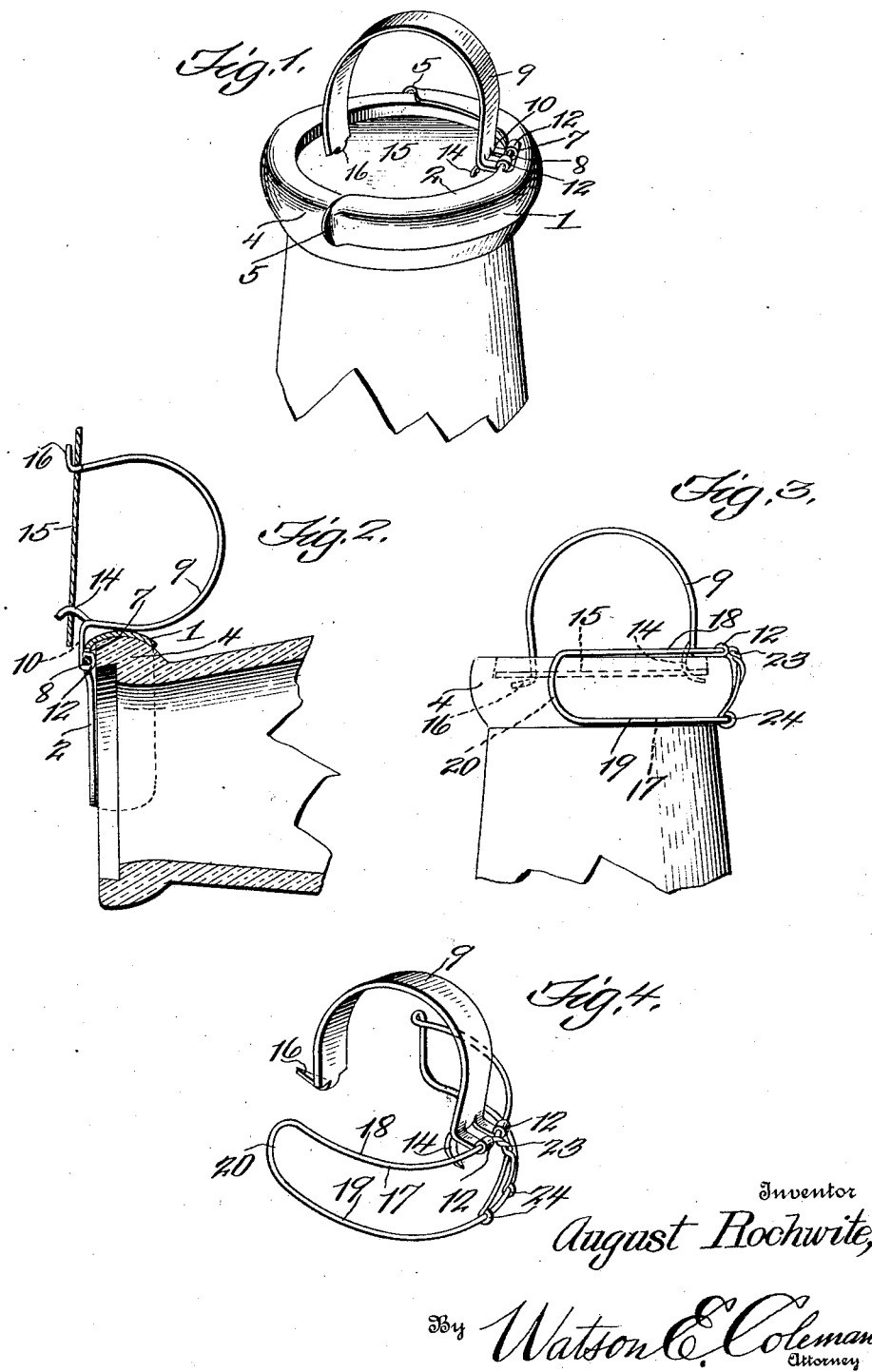

AUGUST ROCHWITE, OF HARTFORD, WISCONSIN.

LIFTER FOR MILK-BOTTLE CAPS.

1,408,641.     Specification of Letters Patent.     Patented Mar. 7, 1922.

Application filed May 3, 1920, Serial No. 378,678. Renewed March 19, 1921. Serial No. 453,716.

*To all whom it may concern:*

Be it known that I, AUGUST ROCHWITE, a subject of Germany, residing at Hartford, in the county of Washington and State of Wisconsin, have invented certain new and useful Improvements in Lifters for Milk-Bottle Caps, of which the following is a specification, reference being had to the accompanying drawings.

This invention relates to an improved lifter for milk bottle caps or covers, and an object is to provide a very simple, efficient and practical device, capable of being easily and very quickly applied to the mouth end of a milk bottle so that the cap of the bottle can be attached to and lifted by said lifter at will whenever it is needed to open the bottle.

Another object is to provide a device which is capable of being very cheaply made and sold at a reasonable profit.

Another object is to provide a support adapted to engage partially about the marginal flange of the mouth end of the bottle and provided with a hingely mounted member having spurs to engage the cap or closure of the milk bottle whereby it can be readily opened when need be in order to gain access to the contents of the bottle.

Another object is to provide means to hold the hingedly mounted member in a swung back position so as to hold the cap open when the bottle is up-turned and prevent the cap from closing as the contents are leaving the bottle.

Still another object is the provision of a holder for the milk bottle cap lifter constructed from a single length of wire material to engage the mouth end of the bottle.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a perspective view of the upper end of a milk bottle showing the improved lifter as applied thereto showing the hingedly mounted member as in engagement with the cap.

Figure 2 is a vertical sectional view through the mouth end of the bottle showing the hingedly mounted member as having been swung back and the cap in an open position, the bottle being tilted in order to indicate that the hingedly mounted member will not close while the contents are being poured from the bottle, Figure 3 is a view of a milk bottle showing a modified form of lifter as applied thereto, the bottle cap being shown in dot and dash lines, Figure 4 is a detail perspective view of the lifter shown in Figure 3.

Referring to the drawings, 1 designates a substantially semi-circular support or clamp constructed from a single piece of metal to engage the flange or roll at the mouth end of the milk bottle. This clamp has a marginal flange 2 engaging over the roll or flange of the milk bottle to prevent downward movement of the clamp, while the clamp is curved in cross section to conform to the curvature of the roll or flange 4 of the milk bottle.

The ends of the clamp 1 are flared outwardly as indicated at 5 so as to be engaged by the fingers so as to remove the clamp from the bottle when it is desired to apply it to another bottle. The clamp is of such a construction as to fit a trifle more than half the circular contour of the mouth end of the bottle so as to retain the clamp in position. The flanges of the clamp which overlies the roll or flange of the milk bottle is provided with a slot 7 and the bar 8 which is caused to be formed by the slot constitutes a pivot for the cap lifting member 9 which is arched as shown. The hinged end of the lifter is bifurcated as shown at 10 and the forks cause to be formed by the bifurcation terminate in hinge rolls 12 which engage the pivot bar, thereby hingedly mounting the cap lifter.

The forks are spread sufficiently to frictionally contact with the ends of the slot in order to frictionally retain the lifter in a swung back position when the cap is open. In order to further assist in holding the lifter in a swung back position, the bar is rectangular in cross section and the hinge rolls of the forks are slightly flattened or slightly rectangular in cross section so as to cause a binding between said parts when the lifter is swung back in order to hold the lifter in such a position.

The lifter has a prong 14 adjacent the forked end of the lifter which is so shaped and pointed as to pierce the cap 15 of a milk bottle to assist in removing the cap from the bottle. In fact this prong is formed when forming the bifurcation in the hinge end of the lifter. The free end of the lifter terminates in a prong 16 which is disposed laterally and is pointed, adapted to extend through the cap 15 of the milk bottle to assist materially in extracting the cap from the bottle. It will be noted that when the device is applied to the bottle and the prongs in engagement with the cap, the lifter may be engaged by the finger of the hand and the cap extracted. As long as the bottle contains milk or other fluid, the device may remain applied and whenever the contents are needed the cap may be swung open and will remain open as long as the contents are being poured from the bottle.

In Figures 3 and 4 a modified form of cap lifting device is provided and in this form the clamp 17 which carries the lifter is constructed from a single length of wire material, bent upon itself to form the upper and lower parts 18 and 19. The parts 20 engage the flange of the milk bottle, while the downwardly extending parts 23 (which are twisted together adjacent the upper portion of the clamp) have their lower ends terminating in eyes 24 engaging the lower part of the clamp.

In this form where the forks are hingedly mounted on the upper part of the clamp, the upper part of the clamp is rectangular so as to insure causing friction between the hinge rolls of the forks of the lifter in order to frictionally hold the lifter in a swung back position.

The invention having been set forth, what is claimed as new and useful is:—

1. In a milk bottle cap lifter, the combination with a clamp engaging the roll or flange of a milk bottle, a cap lifter hingedly mounted upon said clamp, said lifter having a prong adjacent one end thereof and a prong at the opposite end, said prongs adapted to engage the cap of the milk bottle whereby the lifter may be swung back in order to extract the cap from the bottle, and means to hold the lifter in a swung back position to keep the cap open when the bottle is partially upturned.

2. In a device as set forth, a clamp adapted to engage the roll or flange of the mouth end of a milk bottle, said clamp having a flange overlying the peripheral edge of the milk bottle, a cap lifting member hingedly mounted on the flange of the clamp, said lifter having a prong adjacent one end thereof and a prong at the opposite end, said prongs adapted to engage through the cap of the milk bottle whereby upon swinging the lifter back, the cap may be extracted.

3. In a device as set forth, a clamp adapted to engage the marginal flange of a milk bottle, said clamp having a flange overlying the peripheral edge of the mouth end of the milk bottle, said flange having a slot and an adjacent hinge bar, a lifter hingedly mounted upon said bar, said lifter having a prong adjacent one end thereof and a prong at the opposite end, said prongs adapted to engage through the cap of the milk bottle to extract the cap when the lifter is swung back, said hinge bar and the hinge end of the lifter being so formed and constructed as to cause friction between said parts to hold the lifter in a swung back position.

4. In a device as set forth, a clamp adapted to engage the roll or flange of the mouth end of a milk bottle, said clamp having a flange overlying the peripheral edge of the milk bottle, a cap lifting member hingedly mounted on the flange of the clamp, said lifter having a prong adjacent one end thereof, and a prong at the opposite end, said prongs adapted to engage through the cap whereby upon swinging the lifter back, the cap may be extracted, the hinge end of the lifter having means to cause friction to retain the lifter in a swung back position, while the milk bottle is upturned.

In testimony whereof I hereunto affix my signature.

AUGUST ROCHWITE.